United States Patent [19]
Otaki et al.

[11] Patent Number: 5,572,359
[45] Date of Patent: Nov. 5, 1996

[54] DIFFERENTIAL INTERFERENCE MICROSCOPE APPARATUS AND AN OBSERVING METHOD USING THE SAME APPARATUS

[75] Inventors: Tatsuro Otaki, Tokyo; Takashi Kawahito, Fujisawa, both of Japan

[73] Assignee: Nikon Corporation, Tokyo, Japan

[21] Appl. No.: 269,125

[22] Filed: Jun. 30, 1994

[30] Foreign Application Priority Data

Jul. 15, 1993 [JP] Japan .................................. 5-196717

[51] Int. Cl.$^6$ ............................ G02B 21/06; G02B 21/00
[52] U.S. Cl. ........................... 359/386; 359/371; 359/385
[58] Field of Search ................................ 359/368–371, 359/385–390; 354/434

[56] References Cited

U.S. PATENT DOCUMENTS

| | | | |
|---|---|---|---|
| 3,561,876 | 2/1971 | Hoffman | 359/371 |
| 4,412,246 | 10/1983 | Allen et al. | 356/434 |
| 4,795,246 | 1/1989 | Lord | 359/371 |
| 4,964,707 | 10/1990 | Hayashi | 359/371 |
| 5,280,387 | 1/1994 | Maruyama | 359/557 |

FOREIGN PATENT DOCUMENTS

| | | |
|---|---|---|
| 0165634 | 12/1985 | European Pat. Off. . |
| 3148858 | 1/1983 | Germany . |

OTHER PUBLICATIONS

Ryoko Technical Report, vol. 27, No. 319, Aug. 1, 1990.
M. Pluta, *Variable Phase–Contrast and Interference Microscopy*, OPTIK, vol. 39, No. 2, 1973, pp. 126–133.

*Primary Examiner*—Thong Nguyen

[57] ABSTRACT

A differential interference microscope which includes a light source, a condenser optical system for condensing beams of light from the light source and illuminating an object with the beams of light, an objective optical system for converging the beams of light from the illuminated object and forming an image of the object, a pick-up device for photoelectrically detecting the image of the object, and a contrast enhancement circuit for enhancing a contrast of the image on the basis of an output signal of the pick-up device. A first polarizing element and a first birefringent element are disposed sequentially in an optical path between the light source and the object. The first polarizing element changes the beams of light from the light source into predetermined beams of polarized light. The first birefringent element separates the polarized light into an ordinary ray and an extraordinary ray. A second birefringent element and a second polarizing element are disposed sequentially in an optical path between the object and the image. The second birefringent element guides the two light beams from the object onto the same optical path. The second polarizing element causes the two light beams guided onto the same optical path to interfere with each other. The shear quantity S between the ordinary ray and the extraordinary ray satisfies the following condition:

$$\delta/20 \leq S < \delta/2$$

where $\delta$ is the resolving power of the objective optical system.

11 Claims, 4 Drawing Sheets

FIG. 4
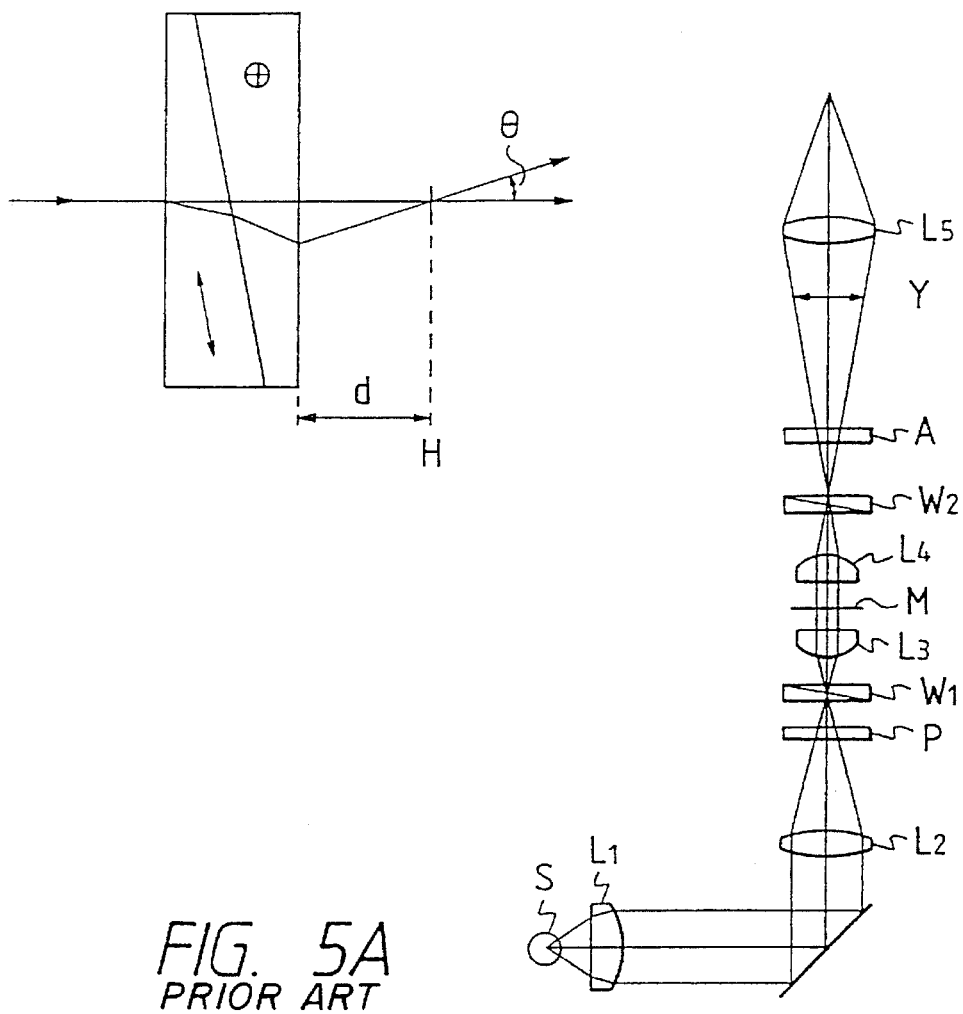
FIG. 5A
PRIOR ART
FIG. 5B
PRIOR ART
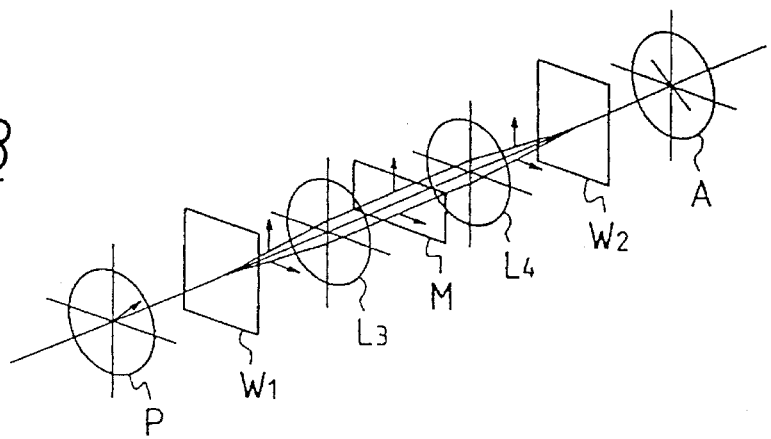

DIFFERENTIAL INTERFERENCE MICROSCOPE APPARATUS AND AN OBSERVING METHOD USING THE SAME APPARATUS

BACKGROUND OF THE INVENTION

1. Field of the Invention

The present invention relates to a differential interference microscope apparatus employed for observing, e.g., a living specimen. The present invention also relates to an observing method using the differential interference microscope apparatus.

2. Related Background Art

A conventional differential interference microscope includes, e.g., a transmitted illumination type of microscope as shown in FIGS. 5A and 5B. This type of differential interference microscope is constructed as follows. Referring to FIG. 5A, a specimen M is Koehler-illuminated with a beam of light from a light source S through lenses $L_1$, $L_2$ and a condenser lens $L_3$. The transmitted light of this specimen M forms a magnified image Y via an objective lens $L_4$. The magnified image Y is observed with a naked eye through an eyepiece $L_5$ in a microscope optical system. This microscope optical system incorporates differential interference members, i.e., a polarizer P, an analyzer A, a Wollaston prism $W_1$ and a Wollaston prism $W_2$.

The Wollaston prism $W_1$ is disposed in a position of entrance pupil of the condenser lens $L_3$. The Wollaston prism $W_2$ is disposed in a position of exit pupil of the objective lens $L_4$. The polarizer P is disposed on this side (on the side of the light source S) of the Wollaston prism $W_1$. The analyzer A is disposed in rear (on the side of the eyepiece $L_5$) of the Wollaston prism $W_2$.

The Wollaston prism is, as illustrated in FIG. 6, constructed by bonding two pieces of right-angle prisms cut out in a state where directions of their optical axes are orthogonal to each other. Herein, the directions (shown by arrowheads) of one optical axis are set parallel to the sheet surface, while the directions (marked with (+)) of the other optical axis are set perpendicular to the sheet surface. This prism separates a beam of incident light into two beams of rectilinear polarized light having oscillatory planes orthogonal to each other. At this time, the beam of incident light is separated into the two beams of polarized light at an angle-of-deviation θ determined by an apical angle α of the right-angle prism. The angle-of-deviation θ is given by: $\theta = 2(n_e - n_o) \tan\alpha$, where $n_e$ is the refractive index of the Wollaston prism with respect to an extraordinary ray, and $n_o$ is the refractive index of the Wollaston prism with respect to an ordinary ray.

According to the above construction, as illustrated in FIG. 5B, the rectilinear polarized light in the arrowed direction is taken out of the light emerging from the light source S by means of the polarizer P. This rectilinear polarized light is separated by the Wollaston prism $W_1$ at the angle-of-deviation θ into the two beams of rectilinear polarized light, which are orthogonal to each other. Normally, the Wollaston prism is selected corresponding to an objective lens employed but is replaced together when exchanging the objective lens.

The thus separated two light beams fall on the condenser lens $L_3$. If the Wollaston prism $W_1$ is located on a front-side focal plane of the condenser lens $L_3$ at this time, however, the two beams of rectilinear polarized light become parallel beams spaced by a quantity (shear quantity) S away from each other. The shear quantity S is determined by the focal length $f_c$ of the condenser lens $L_3$ and the angle θ but is given by $S = f_c \cdot \tan\theta$. The specimen M is then irradiated with the parallel beams.

The two light beams penetrating the specimen M converge on a rear-side focal plane of the objective lens $L_4$ via the objective lens $L_4$ and become a single beam of light through the Wollaston prism $W_2$ disposed therein. This beam of light travels on the same optical path. With a further transmission through the analyzer A, antiphase components of these two light beams are taken out, resulting an interference with each other.

That is, if there is produced no difference in terms of the optical path between the two light beams due to a penetration into the specimen M, the two light beams interfere with each other, offset each other and darken. Whereas if the difference in the optical path is produced, however, the beams look bright. The differential interference microscope utilizes this principle. Even when the specimen M is colorless and transparent, but if there is caused the difference in the optical path between the two light beams in accordance with a difference in terms of a thickness or a refractive index within the specimen M, the specimen M can be observed with a difference in brightness.

In this type of differential interference microscope, the specimen is observed mainly with the naked eye, and therefore, the image Y is required to have a contrast to some extent. This contrast is determined by a magnitude of the shear quantity S. When enhancing the contrast, the shear quantity S may be increased. Supposing that, for instance, as illustrated in FIG. 7A, a portion M' exhibiting a high refractive index exists in the specimen M, and when the same phasic plane of the beam is expressed by a line segment ab, the incident light ab, after passing through the specimen M, travels forward taking a shape a'b'. At this time, the two light beams spaced by the shear quantity S are overlapped with each other as shown in FIG. 7B. The contrast is, however, obtained with brightness and darkness, which are produced due to an optical path difference Δ between the two light beams. As obvious from the Figure, when the shear quantity S is small, the optical path difference Δ between the two light beams results in a lower contrast. When the shear quantity S is taken large, the contrast is enhanced. The contrast between the brightness and darkness is produced even with a slight inclination.

In the above-described conventional differential interference microscope, however, when enhancing the contrast by increasing the shear quantity S, a resolving power of the objective lens $L_4$ has to be sacrificed to some extent.

For example, when the shear quantity S exceeds the resolving power δ ($\delta = 0.61 \times \lambda / N.A.$) of the objective lens, the image Y of the specimen M looks double. Further, even when the shear quantity S is not so large but set under the resolving power δ of the objective lens $L_4$, and if set in the vicinity of the resolving power δ, there happens such a phenomenon that the image is extended in the direction of this shear quantity S.

This conduces to such a problem that hyperfine portions appear with no contrast, which are to be originally resolvable by a performance of the objective lens. Hence, it has hitherto been desirable that the shear quantity S be decreased so as not to spoil the resolving power of the objective lens to the greatest possible degree. For obtaining a relatively high contrast, however, there is a limit wherein the shear quantity S is set on the order of δ/2.

SUMMARY OF THE INVENTION

It is a primary object of the present invention to provide a differential interference microscope capable of making more use of a resolving power of an objective lens than in the prior art even when enhancing a contrast.

It is another object of the present invention to provide an observing method capable of making more use of the resolving power of the objective lens than in the prior art.

To accomplish the above object, according to one aspect of the present invention, there is provided a differential interference microscope apparatus comprising: a light source; a condenser optical system for condensing beams of light from the light source and illuminating an object with the beams of light; an objective optical system for converging the beams of light from the illuminated object and forming an image of the object; a pick-up device for photoelectrically detecting the image of the object; and a contrast enhancement circuit for enhancing a contrast of the image on the basis of an output signal of the image of the object photoelectrically detected by the pick-up device. A first polarizing element and a first birefringent element are disposed sequentially from the side of the light source in an optical path between the light source and the object. The first polarizing element changes the beams of light from the light source into predetermined beams of polarized light. The first birefringent element separates the polarized light into an ordinary ray and an extraordinary ray. A second birefringent element and a second polarizing element are disposed sequentially from the side of the object in an optical path between the object and the image. The second birefringent element guides the two light beams from the object onto the same optical path. The second polarizing element causes the two light beams guided onto the same optical path to interfere with each other. Herein, the shear quantity S between the ordinary ray and the extraordinary ray satisfies the following condition:

$$\delta/20 \leq S < \delta/2 \qquad (1)$$

where $\delta$ is the resolving power of the objective optical system.

Further, to accomplish the above object, according to another aspect of the present invention, there is provided a method of observing an object by use of a differential interference microscope apparatus, comprising: a first step of converting a beam of light from a light source into a predetermined beam of polarized light; a second step of separating the predetermined beam of polarized light into two light beams of an ordinary ray and an extraordinary ray; a third step of irradiating the object with the two light beams; a fourth step of guiding the two light beams via the object onto the same optical path; a fifth step of causing the two light beams guided onto the same optical path to interfere with each other; a sixth step of forming an image of the object on the basis of the two light beams interfered with each other by converging action of the objective optical system; a seventh step of photoelectrically converting the formed image; and an eighth step of enhancing a contrast of the image on the basis of an output of the photoelectrically converted image. Herein, the shear quantity S between the ordinary ray and the extraordinary ray satisfies the following condition:

$$\delta/20 \leq S < \delta/2 \qquad (1)$$

where $\delta$ is the resolving power of the objective optical system.

According to the present invention, the light beam from the light source is changed by the first polarizing element into the predetermined beam of polarized light. The birefringent element such as the Wollaston prism separates the polarized light into two light beams of the ordinary ray and the extraordinary ray. The two light beams are condensed by the condenser lens, and the object is illuminated with the condensed light. The two light beams through the object are guided by the second birefringent element onto the same optical path. The second polarizing element causes the light beams to interfere with each other. The differential interference microscope thus obtains a differential interference image. Then, according to the present invention, the pick-up element photoelectrically detects the image of the object with respect to the above differential interference image. The contrast enhancement circuit enhances the contrast if the image of the object detected by the pick-up element.

According to the present invention, with the construction described above, the contrast of the obtained differential interference image, although it is low, can be enhanced. It is therefore possible to set the optical system to make the contrast low, i.e., to reduce the shear quantity $S = f_c \cdot \tan\theta$ ($f_c$: the focal length of the condenser lens, and $\theta$: the angle of separation between the ordinary ray and the extraordinary ray by the first crystal optical element) between the ordinary ray and the extraordinary ray on the surface of the object.

Hence, according to the present invention, it is feasible to catch the image through the objective lens as an extremely sharp differential interference image and, at the same time, eventually obtain the observation image with a high contrast. This is done without a decline of the image quality while making use of the resolving power of the objective lens as in the case where the image of the object looks double, or the hyperfine portions appear with no contrast.

Note that the shear quantity S is set to satisfy the shovementioned conditional expression (1) where $\delta$ is the resolving power of the objective lens according to the present invention. If under a lower limit of this conditional expression, the shear quantity S is too small, resulting in an extremely small interference effect of the two light beams. Even when enhancing the contrast, a high contrast enough for the observation can not be obtained. Further, it is difficult to manufacture the crystal optical element (Wollaston prism) acting to remarkably reduce the shear quantity S, i.e., decrease the angle-of-separation $\theta$ between the ordinary ray and the extraordinary ray.

Whereas if above an upper limit thereof, there exists a possibility where the resolving power is spoiled as in the same way with the conventional differential interference microscope. This is disadvantageous in terms of observing the object in the vicinity of a limit of the resolving power. According to this invention, the observation image exhibiting the high contrast can be obtained while making use of the resolving power of the objective lens all the time by limiting the shear quantity S within a range of the conditional expression (1).

Incidentally, for observing the image of the object with the high contrast by increasing the resolving power of the objective lens, it is desirable that the shear quantity range shown in the conditional expression (1) is further set such as: $\delta/20 \leq S \leq 2\delta/5$.

Note that the present invention may take a construction in which the condenser optical system and the objective optical system are used in common. In the case of this construction, preferably the first and second birefringent elements are employed in common. Further, in the case of the above construction, preferably an optical path splitter is disposed in the optical path between the first polarizing element and the first birefringent element.

Based on this construction, the object is irradiated with the two light beams separated by the first birefringent element through the condenser lens. The light beams reflected from the object travel on a retro-directive course and are again condensed through the condenser lens. The light beams are further guided by the first birefringent element onto the same optical path. Thereafter, the light beams are guided by the optical path splitting element to the second polarizing element, thereby making the two light beams interfere with each other. A differential interference image of the object can be thus obtained.

This image is, in the same way as the mode of this invention, photoelectrically detected by the pick-up element in the observing element. The contrast of the image is enhanced by the contrast enhancing element. Hence, according to the above construction, it is possible to actualize even the reflection type differential interference microscope capable of obtaining the observation image with the high contrast while making use of the resolving power of the objective lens at all times.

BRIEF DESCRIPTION OF THE DRAWINGS

Other objects and advantages of the present invention will become apparent during the following discussion in conjunction with the accompanying drawings, in which:

FIG. 4 is a schematic diagram of assistance in explaining a Nomarski prism usable as a birefringent element;

FIGS. 5A and 5B are schematic views each showing a construction of a conventional differential interference microscope;

DETAILED DESCRIPTION OF THE PREFERRED EMBODIMENTS

Figure 1A:
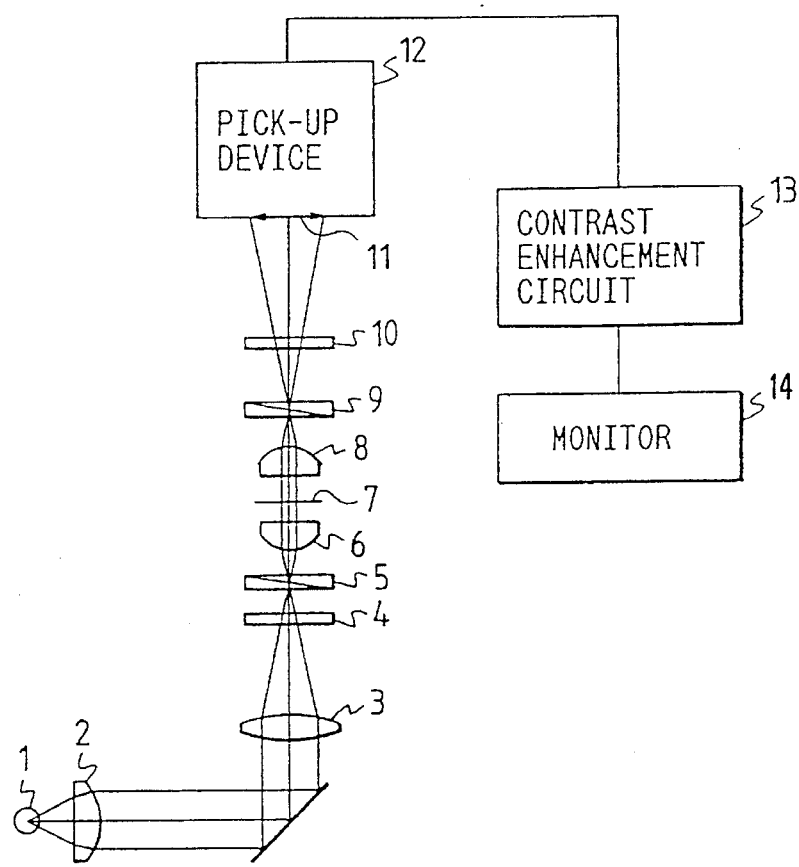
FIG. 1A is a schematic view illustrating a construction of a differential interference microscope in a first embodiment of the present invention.

Embodiments of the present invention will hereinafter be described with reference to the drawings. FIG. 1A illustrates a transmitted illumination type of differential interference microscope apparatus by way of a first embodiment of the present invention. In accordance with this embodiment, a specimen 7 is illuminated with the light emerging from a light source 1 through a lens 2, a lens 3 and a condenser lens 6, thereby obtaining a magnified image 11 through an objective lens 8. The thus constructed microscope incorporates, as differential interference members, a polarizer 4, an analyzer 10, a Wollaston prism 5 and a Wollaston prism 9.

The Wollaston prism 5 is disposed in a position of entrance pupil of the condenser lens 6. The Wollaston prism 9 is disposed in a position of exit pupil of the objective lens 8. The polarizer 4 is placed on this side (on the side of the light source 1) of the Wollaston prism 5. The analyzer 10 is placed in rear of the Wollaston prism 9.

Based on the above construction, the rectilinear polarized light is taken out of the light emerging from the light source 1 by means of the polarizer 4. This rectilinear polarized light is separated by the Wollaston prism 5 at an angle-of-deviation θ into two beams of rectilinear polarized light, which are orthogonal to each other.

The thus separated two light beams are incident on a condenser lens 6 and become parallel beams spaced by a shear quantity S away from each other. A specimen 7 is irradiated with these parallel beams of light. The two light beams penetrating the specimen 7 converge on a rear-side focal plane of the objective lens 8 and, via the objective lens 8, become a single beam of light through the Wollaston prism 9 disposed therein. This beam of light travels on the same optical path. With a further transmission through the analyzer 10, antiphase components of these two light beams are taken out, resulting an interference with each other. A differential interference image is thereby formed on an image surface 11.

Herein, the Wollaston prisms 5 and 9 are structured so that the shear quantity S in the specimen 7 with respect to the resolving power δ of the objective lens 8 is set within a range defined by $δ/20 ≦ S < δ/2$. With this setting, the differential interference image on the image surface 11 is extremely sharp in terms of image because of the shear quantity S being extremely smaller than in the prior art. The differential interference image is, however, low of contrast and can not be therefore captured with a naked eye and an ordinary video camera or the like.

Then, this embodiment involves the use of a contrast enhancement circuit 13 for performing a video-enhancement for enhancing this contrast. The contrast enhancement circuit 13 is provided between a monitor 14 and a pick-up device 12 such as an image pick-up tube and a CCD for photoelectrically detecting the image on the image surface 11.

Figure 1B:
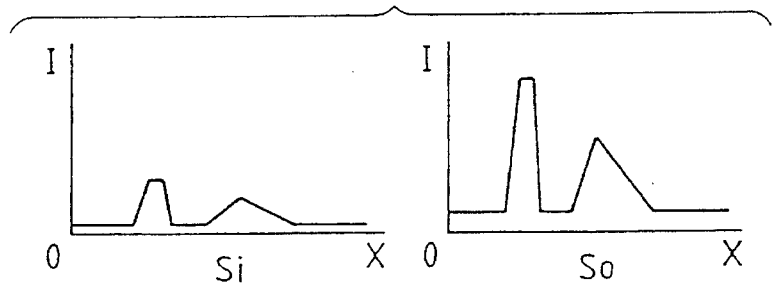
FIGS. 1B and 1C are diagrams illustrating contrast enhancement performed by embodiments of the present invention.

FIG. 1B shows an example of the contrast enhancement in this embodiment. Note that, for simplicity, an intensity of the contrast is expressed, wherein the axis of abscissa indicates the position x, and the axis of ordinate one-dimensionally represents the intensity I. Herein, an input signal Si from the pick-up device 12 is simply amplified and outputted in the form of a signal So onto the monitor 14. Even when a contrast of the input signal Si is weak under a threshold value with which a naked-eye observable state is attained in the conventional differential interference microscope, the output So exhibits a well-observed contrast on the monitor 14.

Figure 1C:
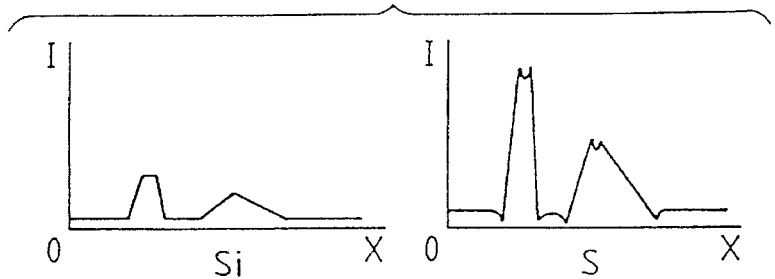

Further, a method of enhancing the contrast involves detecting, as illustrated in, e.g., FIG. 1C, an edge portion of the input signal Si transmitted from the pick-up device 12 by taking a differential of the input signal Si once or twice. It is thus possible to increase or decrease intensities of the signals corresponding to a wave-crest and a wave-trough of the edge portion and further to employ a so-called edge enhancement technique. Incidentally, referring to FIG. 1C, a signal $S_1$ on the monitor 14 undergoes a simple amplification of the input signal Si as shown in FIG. 1B in combination with the edge enhancement.

Note that the method of enhancing the contrast may include a step of changing a relationship of the intensity of the output signal with respect to the intensity of the input signal by use of a non-linear function.

In the thus constructed differential interference microscope of this embodiment, the shear quantity S is set to δ/5 and δ/10 (δ: the resolving power of the objective lens 8), and the specimen is observed. Consequently, a sharp observation image is obtained, and there can be seen an image exhibiting a more impact with a high contrast than seeing it with the naked eye through the conventional differential interference microscope in both cases.

Note that this embodiment may take such a construction that the output signals from the contrast enhancement circuit 13 are recorded on a video recording device, a magneto-optic recording device or a memory.

Figure 2:
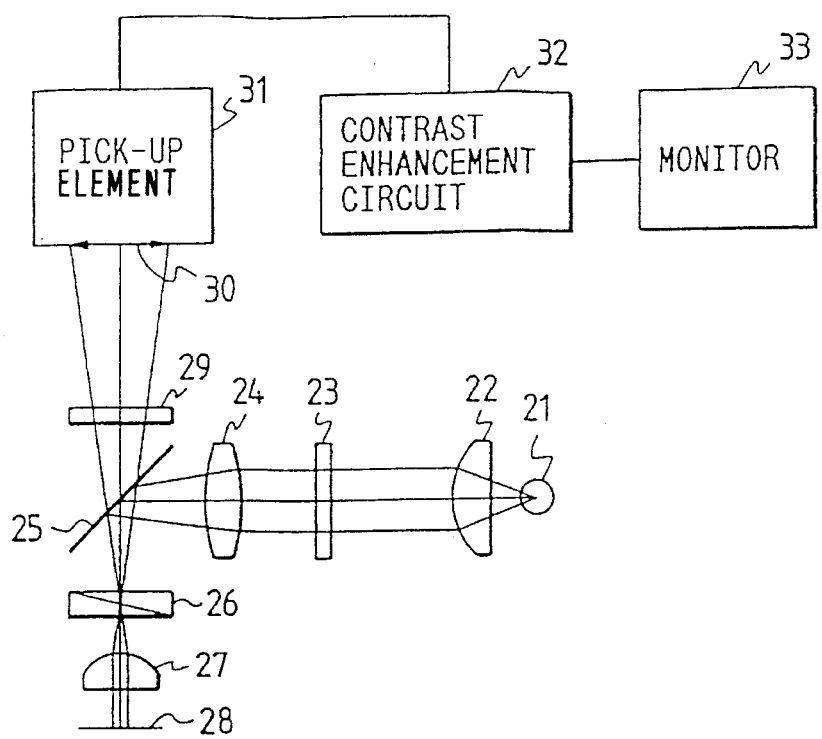
FIG. 2 is a schematic view showing a construction of the differential interference microscope in a second embodiment of this invention.

Next, FIG. 2 illustrates a reflection (vertical illumination) type of differential interference microscope by way of a second embodiment of this invention. In this embodiment, a beam of light from a light source 21 is collimated into parallel beams of light through a collector lens 22. Thereafter, an image thereof is formed by a lens 24 on the pupil plane of an objective lens 27. A specimen surface 28 is illuminated with the light through the objective lens 27. A beam of light reflected from the specimen surface 28 passes again through the objective lens 27, thereby obtaining an image 30. The thus constructed reflection type microscope incorporates a polarizer 23, an analyzer 29 and a Wollaston prism 26.

The Wollaston prism 26 is disposed on the pupil plane of the objective lens 27. The Wollaston prism 26 is constructed so that the shear quantity is, as in the same way with the first embodiment, set to satisfy the above conditional expression (1). In this construction, the rectilinear polarized light is taken out of the light emerging from the light source 21 by means of the polarizer 23. This rectilinear polarized light is separated into two beams of rectilinear polarized light which are orthogonal to each other by the Wollaston prism 26 via the lens 24 and a half-mirror 25.

These two separated beams of light are incident on the objective lens (condenser lens) 27 and then collimated into parallel beams spaced by the shear quantity S from each other. The specimen surface 28 is then irradiated with these parallel beams. The two beams of light reflected by the specimens surface 28 again penetrate the objective lens 27. The beams of light converge on the rear-side focal plane of the objective lens 27 and become a single beam of light through the Wollaston prism 26 located therein. The single beam of light then travels forward on the same optical path. Further, the beam of light penetrates a half-mirror 25 and an analyzer 29 as well. Antiphase components of these two light beams are thereby taken out, resulting in an interference with each other. A differential interference image is thus formed on an image surface 30.

The image on the image surface 30 is, as in the same way with the first embodiment, photoelectrically detected by a pick-up element 31 such as a CCD and an image pick-up tube. A contrast thereof is enhanced by a contrast enhancement circuit 32 and thereafter displayed on a screen of the monitor 33. This displayed image exhibits a sharpness and a high contrast.

Figure 3A:
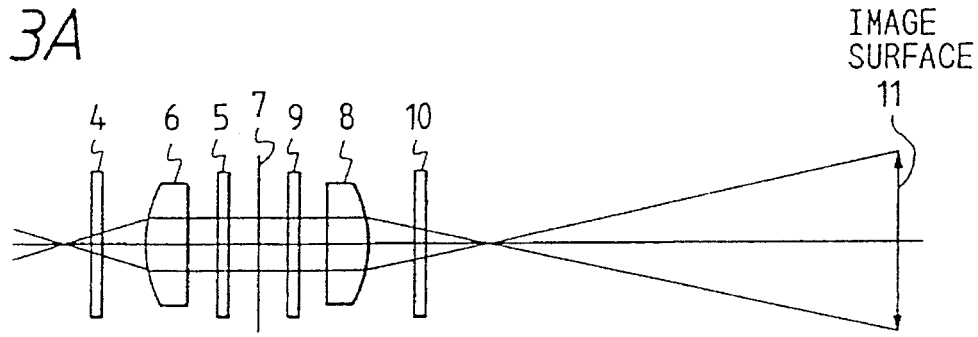
FIGS. 3A and 3B are block diagrams each showing a layout, different from the first and second embodiments, of an objective lens, a polarizing element and a birefringent element.

Note that the embodiment discussed above takes the construction in which the objective lens is of a finite system, and the second birefringent element and the second polarizing element are disposed between the objective lens and the image surface. The present invention is not, however, confined to this construction. For instance, as illustrated in FIG. 3A, the construction may be such that the objective lens 8 is of the finite system as in the first embodiment, the second birefringent element 9 is located between the specimen 7 and the objective lens 8, and a second polarizing element 10 is disposed between the objective lens 8 and the image surface 11. In this case, the first birefringent element 5 is disposed between the condenser lens 6 and the specimen 7. At the same time, the first polarizing element 4 is located on the side of the light source (between the lens 3 and the condenser lens 6) of the condenser lens 6.

Figure 3B:
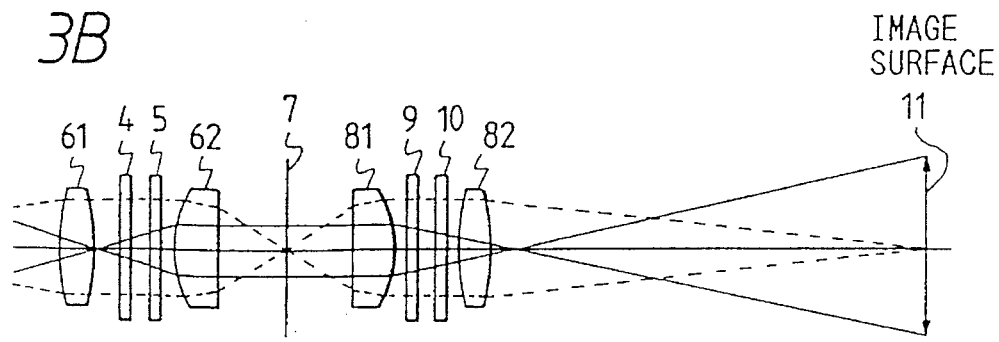
Figure 6:
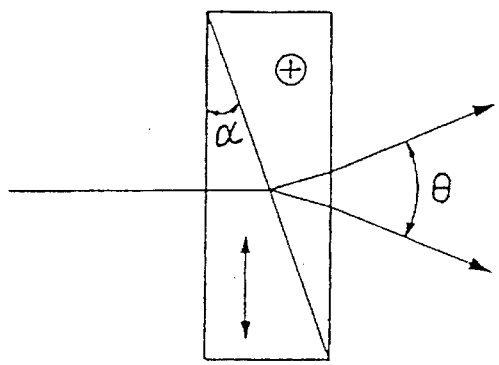
FIG. 6 is a schematic diagram of a Wollaston prism used as a birefringent element.
Figure 7A:
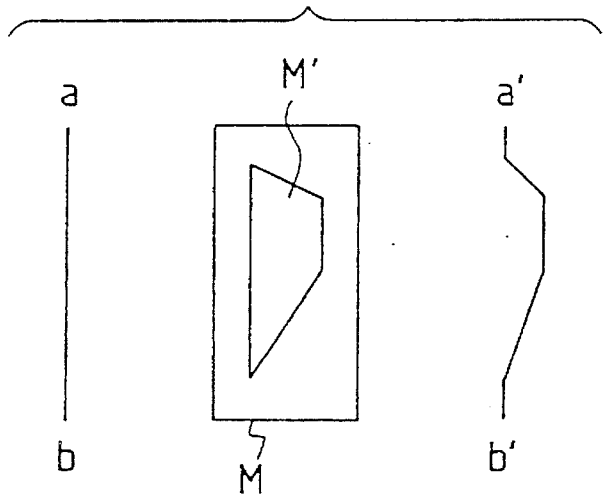
FIGS. 7A and 7B are schematic diagrams each showing a shear quantity between an ordinary ray and an extraordinary ray on a specimen M.
Figure 7B:

Further, as depicted in FIG. 3B, the objective lens 8 shown in FIG. 3A is structured in the form of a two-lens system consisting of lenses 81, 82, and a parallel system (infinity system) is provided between the respective lenses. The second birefringent element 9 and the second polarizing element 10 may be disposed sequentially from the side of the specimen 7 in the parallel beams of light thereof. In this case, the condenser lens 6 is structured, as in the same way with the objective lens 8, in the form of the two-lens system consisting of lenses 61, 62, and the parallel system (infinity system) is provided between the respective lenses. The first birefringent element 5 and the first polarizing element 4 are disposed sequentially from the side of the specimen 7 in the parallel beams of light thereof.

Incidentally, FIGS. 3A and 3B illustrate examples of the transmitted illumination type differential interference microscope. However, the reflective illumination type differential interference microscope as shown in FIG. 2 may also be employed by such an arrangement that the condenser lens 6 and the objective lens 8 are used in common, the birefringent elements 5, 9 are used in common, and the polarizing elements 4, 10 are also used in common.

Shown further in this embodiment is the case where the Wollaston prisms are employed as the birefringent elements. The present invention is not, however, limited to this case but may be applicable to any arrangement wherein the rectilinear polarized light taken out by the first polarizing element can be separated into the two beams of rectilinear polarized light orthogonal to each other at a predetermined angle of deviation. For example, the focal position may exist in the objective lens constructed of a plurality of lens elements.

At this time, the Wollaston prism can not be disposed on the focal plane, and, therefore, a Nomarski prism (a modified Wollaston prism) shown in FIG. 4 is usable. This Nomarski prism intends to separate the light into two light beams in a position spaced by a distance d away from the prism. When a point-of-separation H is set in a position of pupil of the objective lens, there can be obtained the same action as setting the Wollaston prism in the position of pupil.

In each embodiment discussed above, it is possible to obtain the object observation image with the high contrast while making use of the resolving power of the objective lens. Hence, there is exhibited the effect of being capable of observing the extremely sharp image with a well contrast in accordance with the difference in terms of the refractive index or the thickness of even, e.g., the colorless and transparent specimen.

It is apparent that, in this invention, a wide range of different working modes can be formed based on the invention without deviating from the spirit and scope of the invention. This invention is not restricted by its specific working modes except being limited by the appended claims.

What is claimed is:

1. A differential interference microscope apparatus comprising:

a light source;

a condenser optical system for condensing beams of flight from said light source and illuminating an object with the beams of light;

an objective optical system for converging the beams of light from the illuminated object and forming an image of the object;

a pick-up device for photoelectrically detecting the image of the object; and a contrast enhancement circuit for enhancing a contrast of the image on the basis of an output signal of the image of the object photoelectrically detected by said pick-up device, wherein the following elements are disposed sequentially from the side of said light source in an optical path between said light source and the object, said elements being:

a first polarizing element for changing a beam of light from said light source into a predetermined beam of polarized light; and a first birefringent element for separating the beam of polarized light into an ordinary ray beam including an ordinary ray and a corresponding extraordinary ray beam including an extraordinary ray, the ordinary ray beam and corresponding extraordinary ray beam being guided to pass through the object;

wherein the following elements are disposed sequentially from the side of the object in an optical path between the object and the image, said elements being:

a second birefringent element for guiding the ordinary ray beam and corresponding extraordinary ray beam which mass through the object, onto the same optical path; and a second polarizing element for causing the ordinary ray beam and corresponding extraordinary ray beam guided onto the same optical path to interfere with each other, and wherein the shear quantity S between the ordinary ray of the ordinary ray beam and the extraordinary ray of the corresponding extraordinary ray beam satisfies the following condition:

$$\delta/20 \leq S < \delta/2$$

where $\delta$ is the resolving power of said objective optical system.

2. The differential interference microscope apparatus according to claim 1, wherein said condenser optical system and said objective optical system are common to each other.

3. The differential interference microscope apparatus according to claim 2, wherein said first birefringent element and said second birefringent element are common to each other.

4. The differential interference microscope apparatus according to claim 3, wherein an optical path splitter is disposed in an optical path between said first polarizing means and said first birefringent element.

5. The differential interference microscope apparatus according to claim 1, wherein said first and second birefringent elements include Wollaston prisms.

6. The differential interference microscope apparatus according to claim 1, wherein the shear quantity S between the ordinary ray of the ordinary ray beam and the extraordinary ray of the extraordinary ray beam satisfies the following condition:

$$\delta/20 \leq S < 2\delta/5$$

where $\delta$ is the resolving power of said objective optical system.

7. A method of observing an object by use of a differential interference microscope apparatus which includes an objective optical system having a corresponding resolving power, the method comprising the steps of:

a first step of converting a beam of light from a light source into a predetermined beam of polarized light;

a second step of separating the predetermined beam of polarized light into an ordinary ray beam including an ordinary ray and a corresponding extraordinary ray beam including an extraordinary ray;

a third step of irradiating the object with the ordinary ray beam and corresponding extraordinary ray beam, to pass the ordinary ray beam and corresponding extraordinary ray beam through the object;

a fourth step of guiding the ordinary ray beam and corresponding extraordinary ray beam passing through the object onto the same optical path;

a fifth step of causing the ordinary ray beam and corresponding extraordinary ray beam guided onto the same optical path to interfere with each other;

a sixth step of forming an image of the object on the basis of the ordinary ray beam and corresponding extraordinary ray beam interfered with each other by converging action of said objective optical system;

a seventh step of photoelectrically converting the formed image; and an eighth step of enhancing a contrast of the image on the basis of an output of the photoelectrically converted image, wherein the shear quantity S between the ordinary ray of the ordinary ray beam and the extraordinary ray of the corresponding extraordinary ray beam satisfies the following condition:

$$\delta/20 \leq S < \delta/2$$

where $\delta$ is the resolving power of said objective optical system.

8. A differential interference microscope apparatus for viewing an object, comprising:

a light source for projecting a beam of light;

a condenser optical system for receiving and condensing the beam of light projected by the light source;

a first polarizing element for receiving the condensed beam of light and changing the condensed beam of light into a beam of polarized light;

a first birefringent element for receiving the beam of polarized light and separating the beam of polarized light into an ordinary ray beam including an ordinary ray and a corresponding extraordinary ray beam including an extraordinary ray, the ordinary ray beam and corresponding extraordinary ray beam being guided to pass through the object;

an objective optical system for receiving and condensing the ordinary ray beam and corresponding extraordinary ray beam passing through the object;

a second birefringent element for guiding the ordinary ray beam and corresponding extraordinary ray beam condensed by the objective optical system, onto the same optical path;

a second polarizing element for causing the ordinary ray beam and corresponding extraordinary ray beam guided onto the same optical path to interfere with each other and form an image of the object;

a pick-up device for photoelectrically detecting the image of the object formed by the ordinary ray beam and corresponding extraordinary ray beam, and producing a corresponding output signal; and a contrast enhancement circuit for receiving the output signal of the pick-up device and enhancing the contrast of the image detected by the pick-up device in accordance with the output signal of the pick-up device, wherein the shear quantity S between the ordinary ray of the ordinary ray beam and the extraordinary ray of the corresponding extraordinary ray beam satisfies the following condition:

$$\delta/20 \leq S < \delta/2$$

where $\delta$ is the resolving power of the objective optical system.

9. A method of observing an object via the use of an objective optical system, comprising the steps of:

projecting a beam of light;

condensing the projected beam of light;

changing the condensed beam of light into a beam of polarized light;

separating the beam of polarized light into an ordinary ray beam including an ordinary ray and a corresponding extraordinary ray beam including an extraordinary ray;

guiding the ordinary ray beam and corresponding extraordinary ray beam to pass through the object;

using an objective optical system to condense the ordinary ray beam and corresponding extraordinary ray beam passing through the object;

guiding the ordinary ray beam and corresponding extraordinary ray beam condensed by the objective optical system, onto the same optical path;

causing the ordinary ray beam and corresponding extraordinary ray beam guided onto the same optical path to interfere with each other and form an image of the object;

photoelectrically detecting the image of the object formed by the ordinary ray beam and corresponding extraordinary ray beam; and enhancing the contrast of the detected image, wherein the shear quantity S between the ordinary ray of the ordinary ray beam and the extraordinary ray of the corresponding extraordinary ray beam satisfies the following condition:

$$\delta/20 \leq S < \delta/2$$

where $\delta$ is the resolving power of the objective optical system.

10. A differential interference microscope apparatus for viewing an object, comprising:

an optical system for forming an ordinary ray beam including an ordinary ray and a corresponding extraordinary ray beam including an extraordinary ray, from a light beam projected by a light source, and for passing the ordinary ray beam and the corresponding extraordinary ray beam through the object;

an objective optical system for receiving and condensing the ordinary ray beam and corresponding extraordinary ray beam passing through the object, to form an image of the object; and a contrast enhancement circuit for enhancing the contrast of the formed image, wherein the shear quantity S between the ordinary ray of the ordinary ray beam and the extraordinary ray of the corresponding extraordinary ray beam satisfies the following condition:

$$\delta/20 \leq S < \delta/2$$

where $\delta$ is the resolving power of the objective optical system.

11. A method of observing an object via the use of an objective optical system, comprising the steps of:

forming an ordinary ray beam including an ordinary ray and a corresponding extraordinary ray beam including an extraordinary ray, from a light beam projected by a light source;

passing the ordinary ray beam and the corresponding extraordinary ray beam through the object;

using the objective optical system to condense the ordinary ray beam and corresponding extraordinary ray beam passing through the object, to form an image of the object; and enhancing the contrast of the formed image, wherein the shear quantity S between the ordinary ray of the ordinary ray beam and the extraordinary ray of the corresponding extraordinary ray beam satisfies the following condition:

$$\delta/20 \leq S < \delta/2$$

where $\delta$ is the resolving power of the objective optical system.

* * * * *

UNITED STATES PATENT AND TRADEMARK OFFICE
CERTIFICATE OF CORRECTION

PATENT NO. : 5,572,359
DATED : Nov. 5, 1996
INVENTOR(S) : Tatsuro Otaki, et al.

It is certified that error appears in the above-indentified patent and that said Letters Patent is hereby corrected as shown below:

Col. 8, line 65, claim 1, delete [flight] and insert --light--.

Signed and Sealed this

Twenty-fifth Day of February, 1997

Attest:

BRUCE LEHMAN

*Attesting Officer*                    *Commissioner of Patents and Trademarks*